United States Patent
Moro et al.

[19]

[11] Patent Number: 6,137,077
[45] Date of Patent: Oct. 24, 2000

[54] INVERTER RESISTANCE WELDING CONTROL APPARATUS

[75] Inventors: Kyoji Moro; Hiroshi Shimada, both of Chiba-ken, Japan

[73] Assignee: Miyachi Technos Corporation, Chiba-ken, Japan

[21] Appl. No.: 09/370,241

[22] Filed: Aug. 9, 1999

[30] Foreign Application Priority Data

Aug. 10, 1998 [JP] Japan .................................. 10-237990

[51] Int. Cl.[7] .................................................. B23K 11/24
[52] U.S. Cl. .......................................... 219/108; 219/110
[58] Field of Search .................................... 219/108, 110; 363/56, 98

[56] References Cited

U.S. PATENT DOCUMENTS 5,965,038  10/1999  Nomura et al. .......................... 219/110
6,011,235   1/2000  Mukai et al. ............................. 219/110

*Primary Examiner*—Clifford C. Shaw
*Attorney, Agent, or Firm*—Wenderoth, Lind & Ponack, L.L.P.

[57] ABSTRACT

When a second switching element $Q_2$ is changed over from ON state to OFF state for each switching cycle while a first switching element $Q_1$ remains ON in a unit weld period $T_a$ for example, a primary current $I_1$ does not come to a stop at once under the influence of inductance of a welding transformer 16 but it flows as a transient current i through a primary circuit until it is off. The transient current i makes a closed circuit through which it flows from a primary coil of the welding transformer 16 via a third diode $D_3$ and then a first switching element $Q_1$ again into the primary coil of the welding transformer 16. More specifically, due to the first switching element $Q_1$ being kept ON, the transient current i which has passed through the third diode $D_3$ flows through the first switching element $Q_1$, without passing through a capacitor 12, and comes back into the primary coil of the welding transformer. Little or substantially no current flows through the capacitor 12.

5 Claims, 13 Drawing Sheets

INVERTER RESISTANCE WELDING CONTROL APPARATUS

BACKGROUND OF THE INVENTION

1. Field of the Invention

The present invention relates generally to a resistance welding apparatus using an inverter, and more particularly to a resistance welding control apparatus for the execution of inverter-controlled welding current supply.

2. Description of the Related Arts

FIG. 12 shows a conventional resistance welding apparatus using an inverter.

In this resistance welding apparatus, the inverter designated at 104 is electrically connected between a rectifying circuit 100 and a primary coil of a welding transformer 106.

The rectifying circuit 100 rectifies a three-phase AC voltage at a commercial frequency from AC power supply terminals, e.g., three-phase AC power supply terminals (U, V, W), into a DC voltage. The DC voltage output from the rectifying circuit 100 is fed via a capacitor 102 to input terminals ($l_0$, $l_1$) of the inverter 104.

The inverter 104 consists of four uni-directional conduction switching elements $q_1$, $q_2$, $q_3$ and $q_4$ typically in the form of transistors, which are bridge connected to each other. Diodes $d_1$, $d_2$, $d_3$ and $d_4$ are connected in parallel to the switching elements $q_1$, $q_2$, $q_3$ and $q_4$, respectively, with their polarities being opposite to those of the switching elements.

Of the four switching elements, the switching elements $q_1$ and $q_2$ constituting a first (positive side) pair are turned ON/OFF at a time by a common switching control signal $s_a$ from a drive circuit 112, whereas the switching elements $q_3$ and $q_4$ constituting a second (negative side) pair are turned ON/OFF at a time by a common switching control signal $s_b$ from the drive circuit 112.

Output terminals ($m_0$, $m_1$) of the inverter 104 are connected to both ends of the primary coil of the welding transformer 106. A pair of welding electrodes 108 and 110 are electrically connected to both ends of a secondary coil of the welding transformer 106. The pair of electrodes 108 and 110 butt (in a confronting manner for example) against associated materials $W_1$ and $W_2$ to be welded and come into pressure contact with them under a pressing force from a pressure mechanism not shown.

A control unit 114 serves to control the supply of welding current, and during the weld time it provides a switching control of the inverter 104 by way of the drive circuit 112 as described above.

FIG. 13 shows a current supply control method effected in this resistance welding apparatus.

Typically, in the inverter resistance welding apparatus having the welding electrodes 108 and 110 directly connected to the secondary coil of the welding transformer 106 without any rectifying circuit intervening therebetween, as in the example shown, a half cycle is allocated to both a unit weld period $T_a$ during which a welding current (primary current) $I_2$ flows continuously through the materials ($W_1$, $W_2$) to be welded in the positive direction and to a unit weld period $T_b$ during which it flows continuously therethrough in the negative direction, and the entire weld time from the start to the end of the welding current supply is set to be equal to the cycle count integer times the half cycle.

The unit weld periods $T_a$ and $T_b$ could be set to any length containing the unit cycle of the inverter frequency multiplied by positive integer, but it may be set to a period equal to the half cycle of 50 Hz or 60 Hz so as to correspond to the commercial frequency for example.

During the unit weld period $T_a$, by way of the drive circuit 112 the control unit 114 turns ON/OFF the switching elements $q_1$ and $q_2$ on the positive side simultaneously at a predetermined inverter frequency, e.g., 10 kHz while the switching elements $q_3$ and $q_4$ on the negative side remain kept OFF.

Thus, at the output terminals ($m_0$, $m_1$) of the inverter 104 there appears a DC pulse-like primary current $I_1$. which could otherwise be acquired by chopping the positive DC voltage by the period of the inverter frequency, the chopped current being fed to the primary coil of the welding transformer 106. Through the secondary circuit of the welding transformer 106 there flows in the positive direction a secondary current $I_2$ having a current value at a predetermined ratio relative to the primary current $I_1$, the current $I_2$ having a current waveform obtained by smoothing the primary current $I_1$.

During the unit weld period $T_b$, by way of the drive circuit 112 the control unit 114 turns ON/OFF the switching elements $q_3$ and $q_4$ on the negative side simultaneously at the above inverter frequency while the switching elements $q_1$ and $q_2$ on the positive side remain OFF.

In consequence, at the output terminals ($m_0$, $m_1$) of the inverter 104 there appears a DC pulse-like primary current $I_1$, which could otherwise be acquired by chopping the negative DC voltage by the period of the inverter frequency, the chopped current being fed to the primary coil of the welding transformer 106. Through the secondary circuit of the welding transformer 106 there flows in the negative direction a secondary current $I_2$ having a current value at a predetermined ratio relative to the primary current $I_1$, the current $I_2$ having a current waveform obtained by smoothing the primary current $I_1$.

It will be appreciated that a halt period Tc for the polarity switching is interposed between the end of each unit weld period and the start of the next unit weld period as shown in FIG. 13.

In the case of the current supply control method as described above, when the two switching elements $q_1$ and $q_2$ or $q_3$ and $q_4$ are changed over from ON state to OFF state in unit cycle $T_0$ of the inverter frequency, the primary current $I_1$ will not stop immediately due to the influence of inductance of the welding transformer 106, but it will flow as a transient current i through the primary circuit until it is shut off.

The transient current i upon the current interruption in the primary circuit will not pass through the switching elements $q_1$, $q_2$, $q_3$ and $q_4$, all of which are in OFF state, but it will flow through the diodes $d_1$, $d_2$, $d_3$ and $d_4$ instead, which are connected in parallel to the associated switching elements.

In the unit weld period $T_a$ for example, when both the switching elements $q_1$ and $q_2$ are changed over from ON state to OFF state in each unit cycle $T_0$, the transient current i will make a closed circuit through which it flows from the primary coil of the welding transformer 106 via the diode $d_3$, the capacitor 102 and the diode $d_4$ again into the primary coil of the welding transformer 106, as indicated by a chain-dotted line of FIG. 12.

In this case, as indicated by hatched portions of FIG. 13, a positively directed flow is imparted to the transient current i (of the primary current $I_1$) between the output terminals ($m_0$, $m_1$) of the inverter 104 and the primary coil of the welding transformer 106, whereas a negatively directed flow is imparted to the transient current i (of the primary current $I_0$) between the input terminals ($I_0$, $I_1$) of the inverter 104 and the capacitor 106.

In the unit weld period $T_b$, on the other hand, when both the switching elements $q_3$ and $q_4$ are changed over from ON state to OFF state in each unit cycle $T_0$, the transient current i although not shown will make a closed circuit through which it flows from the primary coil of the welding transformer 106 via the diode $d_1$, the capacitor 102 and the diode $d_2$ again into the primary coil of the welding transformer 106.

In this case, the transient current i (of the primary current $I_1$) between the output terminals ($m_0$, $m_1$) of the inverter 104 and the primary coil of the welding transformer 106 will flow in the negative direction, and the transient current i (of the primary current $I_0$) between the input terminals ($I_0$, $I_1$) of the inverter 104 and the capacitor 102 will also flow in the negative direction.

Such a conventional resistance welding apparatus entails a deficiency that the capacitor 102 may become worn out and therefore have a shortened lifetime due to heating, which will arise from the above transient current i flowing through the primary circuit of the welding transformer 106 immediately after the switching off of the inverter.

This capacitor 102 is provided intrinsically for smoothing the DC voltage from the rectifying circuit 100. At the same time, the capacitor is also one of the elements which form the closed circuit for allowing a flow of the transient current i. It has a relatively large capacitance and includes a resistance as well. The transient current i causes Joule heat to occur at this resistor. Accordingly as the amount of heating increases and the temperature rises, the capacitor 102 tends to become more worn out and degraded.

Incidentally, the transient current i is proportional to the welding current $I_2$ and the primary current $I_1$. For this reason, if a larger current flows through the materials to be welded, the transient current i will also become larger, resulting in accelerated wearout and degradation of the capacitor 102. As a result, inconveniently it may be difficult to select a large welding current if the lifetime of the capacitor 102 is taken into consideration.

Furthermore, the more frequent use or higher duty cycle the welding machine has, the larger the amount of heating of the capacitor 102 becomes due to the transient current i frequently flowing into the capacitor 102, consequently promoting its wearout and degradation. Therefore, from the viewpoint of lifetime of the capacitor 102, any restriction has to be offered to the duty cycle (rate of operation) as well.

Moreover, when the transient current i flows through the capacitor 102, Joule heat may be generated in conductors such as cables or copper bars as well, which electrically connect the capacitor 102 to the main circuit. This heating will cause the ambient temperature around the capacitor 102 to rise, resulting in shortened lifetime of the capacitor 102.

There may also arise another deficiency that because of vain consumption of power in the primary circuit due to heating of the capacitor 102 in this manner, corresponding reduction may occur in the amount of supply of power to the secondary side as well as in the power efficiency.

SUMMARY OF THE INVENTION

The present invention was conceived in view of the above problems posed in the prior art. It is therefore an object of the present invention to provide an inverter resistance welding control apparatus capable of reducing the heating and wearout of a capacitor interposed between a rectifying circuit and an inverter.

Another object of the present invention is to provide an inverter resistance welding control apparatus achieving a larger welding current and a higher duty cycle.

A further object of the present invention lies in the provision of an inverter resistance welding control apparatus achieving an improvement in welding current efficiency by allowing an effective flow, at a lower power consumption, of a transient current flowing through the primary circuit of a welding transformer immediately after the switching-off of the inverter.

In order to attain the above objects, according to an aspect of the present invention there is provided an inverter resistance welding control apparatus for use in resistance welding effected by the supply of a welding current to a material to be welded, which is electrically connected to a secondary coil of a welding transformer, the resistance welding control apparatus comprising a rectifying circuit for converting an alternating current at a commercial frequency into a direct current; an inverter including two pairs of uni-directional conduction switching elements, each pair of switching elements having an input terminal electrically connected to an output terminal of the rectifying circuit and having an output terminal electrically connected to a primary coil of the welding transformer; a diode connected, in parallel to each switching element of the inverter, with its polarity of conduction reversed to that of the switching element; current supply sequential control means for switchingly selecting, in a predefined sequence, a first current supply mode in which a welding power from the rectifying circuit is fed to the welding transformer by way of first and second switching elements constituting a first pair in the inverter, and a second current supply mode in which a welding power from the rectifying circuit is fed to the welding transformer by way of third and fourth switching elements constituting a second pair in the inverter; first switching control means which in the first current supply mode, iteratively turns ON/OFF, at a predetermined switching frequency, only one of the first and second switching elements while keeping the other ON; and second switching control means which in the second current supply mode, iteratively turns ON/OFF, at a predetermined switching frequency, only one of the third and fourth switching elements while keeping the other ON.

It is preferable in the inverter resistance welding control apparatus that the current supply sequential control means alternately select the first current supply mode and the second current supply mode.

Preferably, in the inverter resistance welding control apparatus, the switching control means includes means which, every time the first current supply mode is iterated, alternately select a first current supply pattern in which only the second switching element is iteratively turned ON/OFF at the inverter frequency while keeping the first switching element ON and a second current supply pattern in which only the first switching element is iteratively turned ON/OFF at the inverter frequency while keeping the second switching element ON, and means which, every time the second current supply mode is iterated, alternately select a third current supply pattern in which only the fourth switching element is iteratively turned ON/OFF at the inverter frequency while keeping the third switching element ON and a fourth current supply pattern in which only the third switching element is iteratively turned ON/OFF at the inverter frequency while keeping the fourth switching element ON.

In the inverter resistance welding, the switching control means may include constant current control means for providing a control of ON/OFF operation of the switching element so as to allow a primary current flowing through a primary circuit of the welding transformer or a secondary current flowing through a secondary circuit to coincide with a set current value.

In the inverter resistance welding control apparatus, the constant current control means may include a clock circuit for generating a clock pulse defining a unit cycle of switching operations of the inverter; limiter level setting means for setting a predetermined limiter level corresponding to the set current value; current detecting means for detecting the primary current or the secondary current during the supply of welding current; and control means which in each clock cycle, turn on the associated switching element in response to a leading edge of the clock pulse and which turn off the switching element at the point of time when an output signal from the current detecting means has reached the limiter level or at the trailing edge of the clock pulse.

According to the inverter resistance welding control apparatus of the present invention, as set forth hereinabove, the primary transient current i upon the switch-off in each switching cycle of the inverter is caused to flow through the closed circuit formed by the primary coil of the welding transformer and the inverter, thereby achieving less heating or less wearout and degradation of the capacitor connected between the rectifying circuit and the inverter, to make it possible to improve the welding current efficiency with a larger welding current and a higher duty cycle.

BRIEF DESCRIPTION OF THE DRAWINGS

The above and other objects, aspects, features and advantages of the present invention will become more apparent when reading the following detailed description in conjunction with the accompanying drawings, in which.

DESCRIPTION OF THE PREFERRED EMBODIMENT

The present invention will now be described with reference to FIGS. 1 to 11 which illustrate a preferred embodiment thereof in a non-limitative manner.

Figure 1:
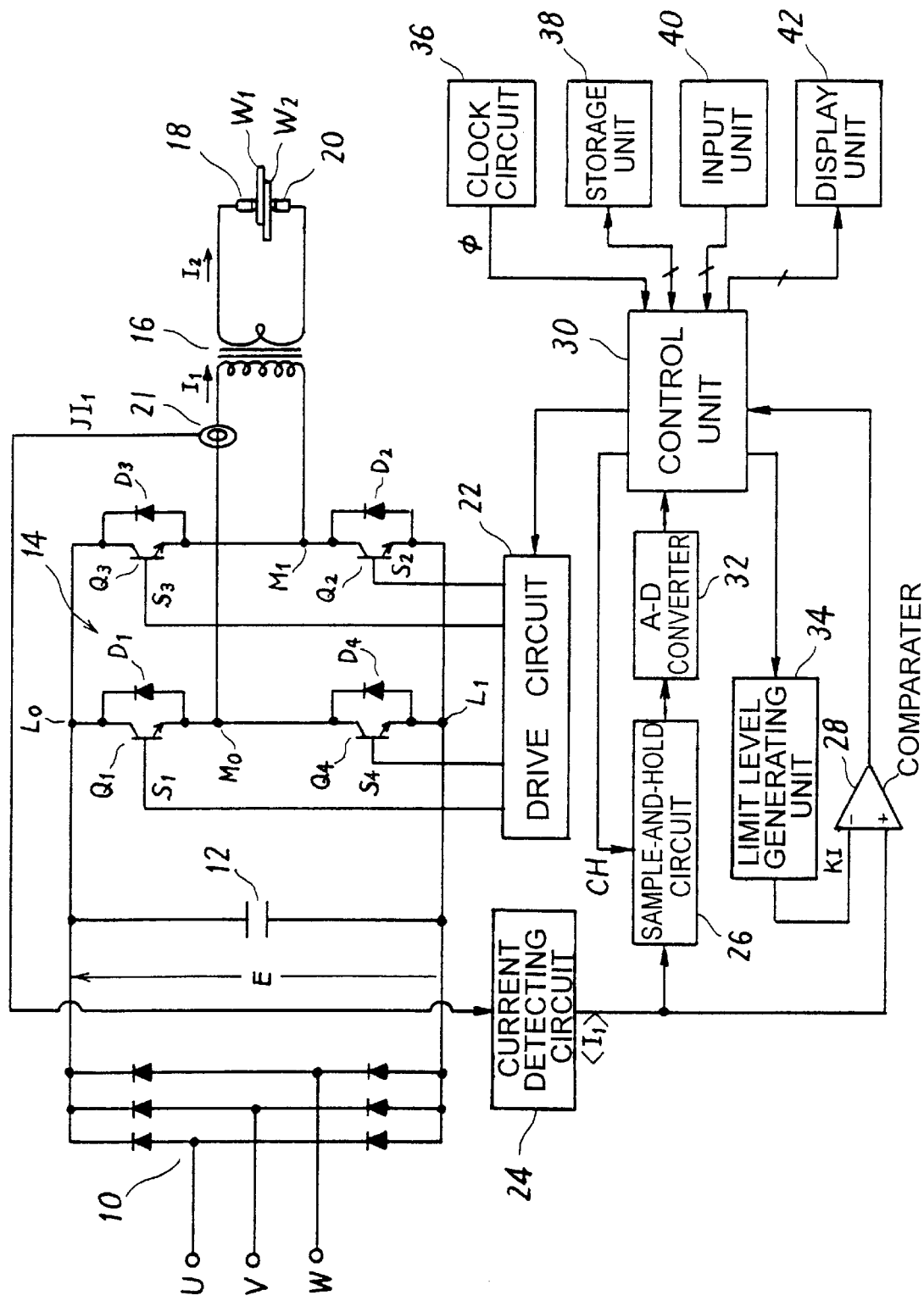
FIG. 1 is a diagram showing a configuration of a resistance welding apparatus employing an inverter resistance welding control apparatus in accordance with an embodiment of the present invention.

Referring to FIG. 1, there is depicted a configuration of a resistance welding apparatus including an inverter resistance welding control apparatus according to the embodiment of the present invention.

An inverter 14 in this resistance welding apparatus comprises two pairs (four) of unit-directional conduction switching elements $Q_1$, $Q_2$, $Q_3$ and $Q_4$, which in pairs are bridge connected with each other, each switching element being composed of a transistor such as a GTR (giant transistor) or an IGBT (insulated gate bipolar transistor). Diodes $D_1$, $D_2$, $D_3$ and $D_4$ are connected, in parallel with the switching elements $Q_1$, $Q_2$, $Q_3$ and $Q_4$, respectively, with each polarity of conduction reversed to that of the associated switching element.

Of these four switching elements, the first and second switching elements $Q_1$ and $Q_2$ constituting a first (positive side) pair are separately ON/OFF controlled by first and second switching control signals $S_1$ and $S_2$, respectively, from a drive circuit 22, while the third and fourth switching elements $Q_3$ and $Q_4$ constituting a second (negative side) pair are separately subjected to an ON/OFF control by third and fourth switching control signals $S_3$ and $S_4$, respectively, from the drive circuit 22.

An inverter 14 has input terminals ($L_0$, $L_1$) connected to output terminals of a rectifying circuit 10 and has output terminals ($M_0$, $M_1$) connected to both ends of a primary coil of a welding transformer 16. A pair of welding electrodes 18 and 20 are connected directly (without intervention of any rectifying circuit) to both ends of a secondary coil of the welding transformer 16. The pair of welding electrodes 18 and 20 butt (in a confronting manner for example) against associated materials $W_1$ and $W_2$ to be welded and come into pressure contact with them under a pressing force from a pressure mechanism not shown.

The rectifying circuit 10 is provided in the form of a three-phase rectifying circuit consisting of, e.g., six diodes which are in three-phase bridge connection, the circuit 10 serving to convert a three-phase AC voltage at a commercial frequency from three-phase AC power supply terminals (U, V, W), into a DC voltage E having a predetermined voltage value. The DC voltage E output from the rectifying circuit 10 is fed via a smoothing capacitor 12 to the inverter 14.

The resistance welding control apparatus of this embodiment employs a current limiter control method as a constant current control method for causing the primary current or secondary current to have a desired set current value through a feedback loop during the supply of welding current.

For this current limiter control there are provided a current sensor 21, a current detecting circuit 24, a sample-and-hold circuit 26, a comparator 28 and an analog-to-digital converter 32.

The current sensor 21 is comprised of a current transformer for example and are attached to a conductor extending between the output terminal of the inverter 14 and the primary coil of the welding transformer 16. During the supply of welding current, the current detecting circuit 24 issues a voltage signal (current detection signal) <$I_1$> indicative of an instantaneous value of a primary current $I_1$, in response to a signal $JI_1$ output from the current sensor 21.

An output terminal of the current detecting circuit 24 is connected both to an input terminal of the sample-and-hold circuit 26 and to one input terminal of the comparing circuit 28.

The sample-and-hold circuit 26 samples and holds an output (current detection signal) <$I_1$> from the current detecting circuit 24 at the timing of a current peak value indicated by a control signal CH from a control unit 30. The current peak value held by the sample-and-hold circuit 26 is converted by the analog-to-digital converter 32 into a digital signal, which in turn is fed to the control unit 30.

The other input terminal of the comparing circuit 28 receives a limit level (voltage) KI corresponding to a set current value (current peak value) from a limit level generating unit 34 under the control of the control unit 30. Arrangement is such that when the current detection signal <$I_1$> from the current detecting circuit 24 reaches the limit level (voltage) KI, the output from the comparing circuit 28 goes from low level to high level.

The control unit 30 is comprised of a microcomputer (CPU) and provides all controls related to the supply of welding current, such as current supply sequential control, current limiter control and inverter switching control.

The control unit 30 is associated directly or via an interface circuit not shown with a clock circuit 36, a storage unit 38, an input unit 40, a display unit 42, etc.

The clock circuit 36 feeds to the control unit 30 a basic clock pulse φ at 10 kHz for example defining a basic cycle (period) of the switching operation of the inverter 14. The storage unit 38 includes a ROM and a RAM. The ROM stores therein a diversity of programs for defining operation of the control unit 30, and the RAM stores therein various set value data, various measured value data, computing data, etc. The input unit 40 includes a variety of keys provided on a console panel of the control apparatus and an interface circuit connected thereto an external device by way of a communication cable. The display unit 42 includes a display and a lamp which are arranged on the console panel of the control apparatus.

Referring then to FIGS. 2 to 8, description is made of a current supply control method effected by the resistance welding control apparatus of this embodiment.

Figure 2:
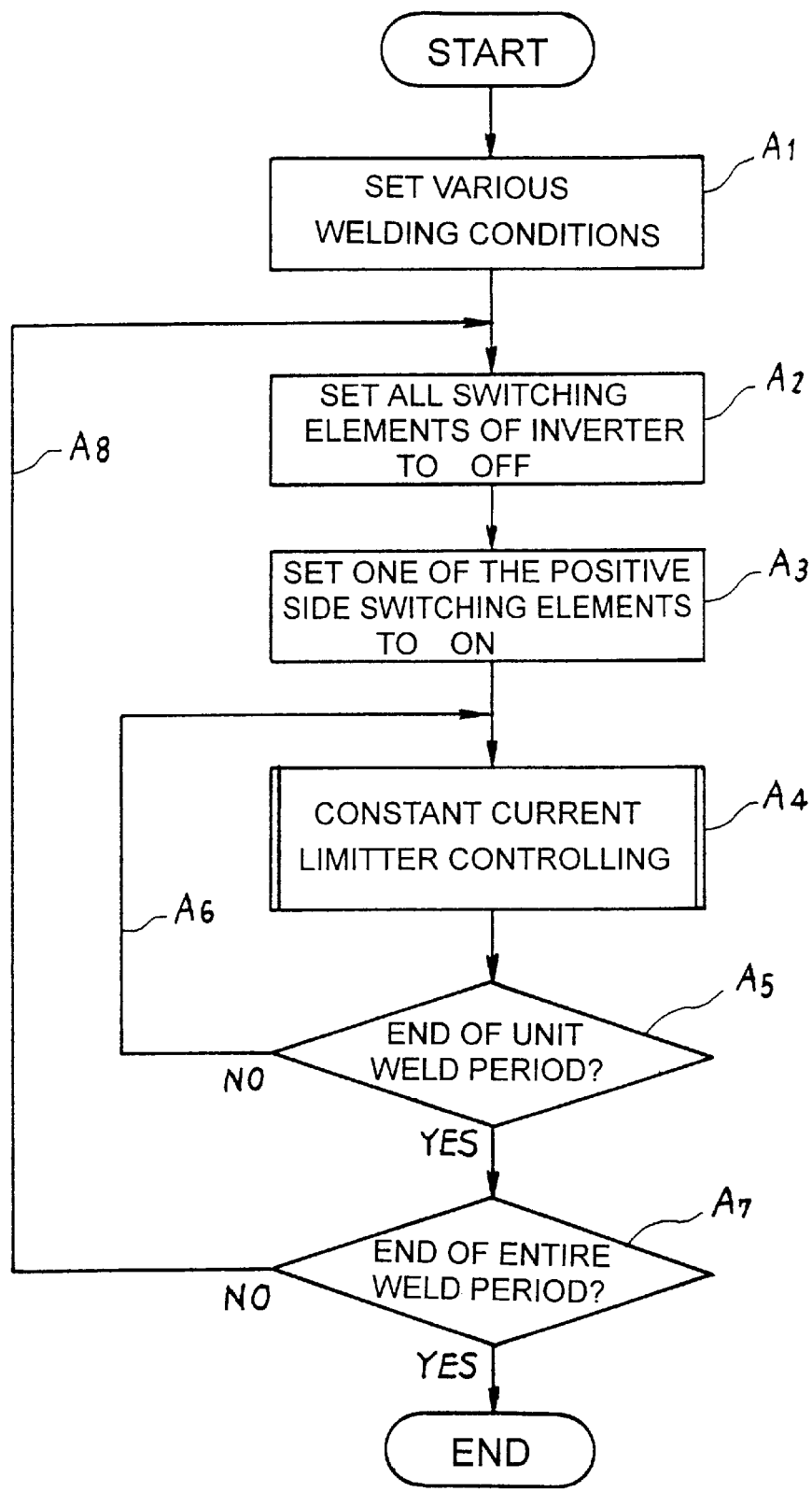
FIG. 2 is a flowchart showing an overall procedure of control provided by a control unit for supply of welding current in the embodiment.
Figure 3:
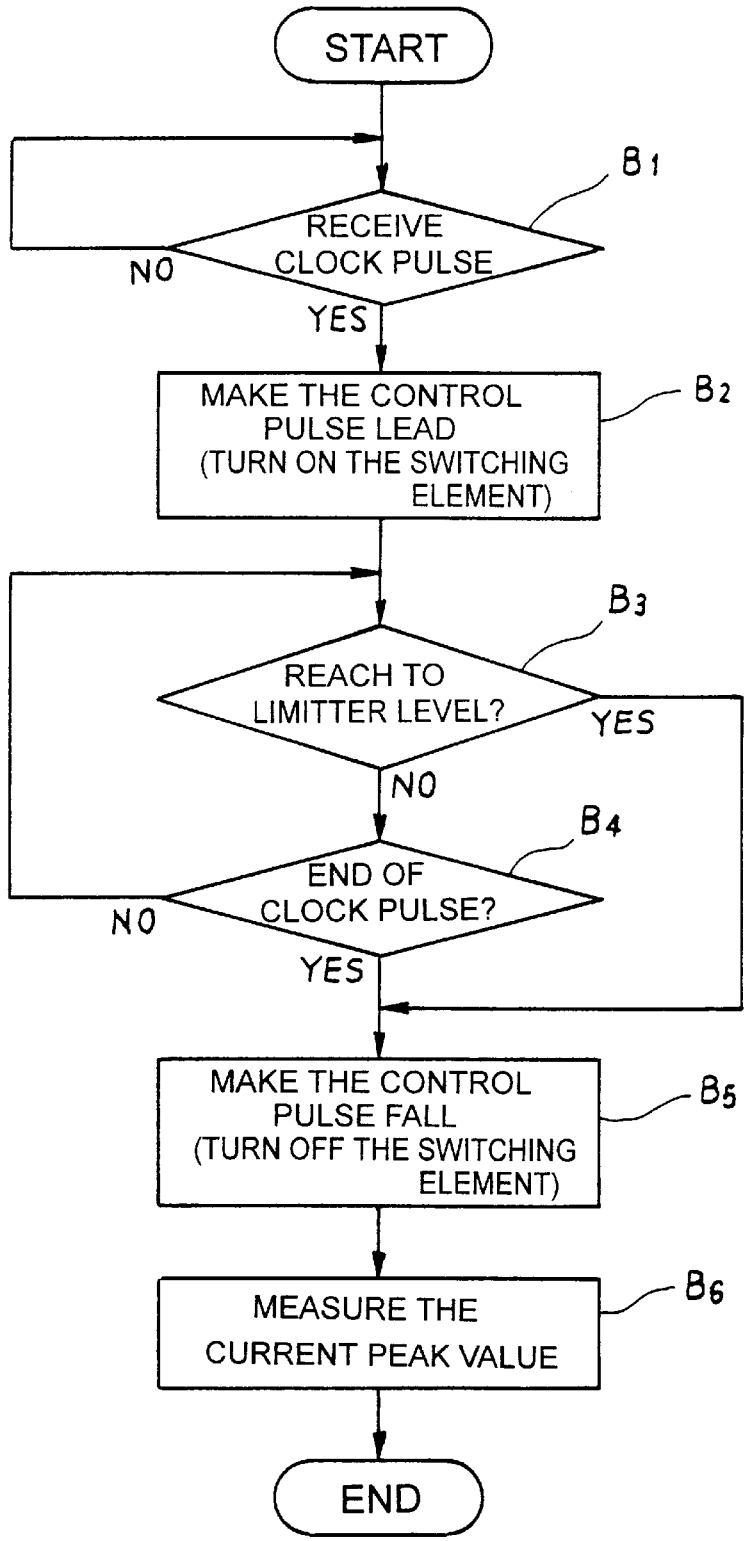
FIG. 3 illustrates a procedure of processing effected in constant current limiter control in the embodiment.
Figure 4:
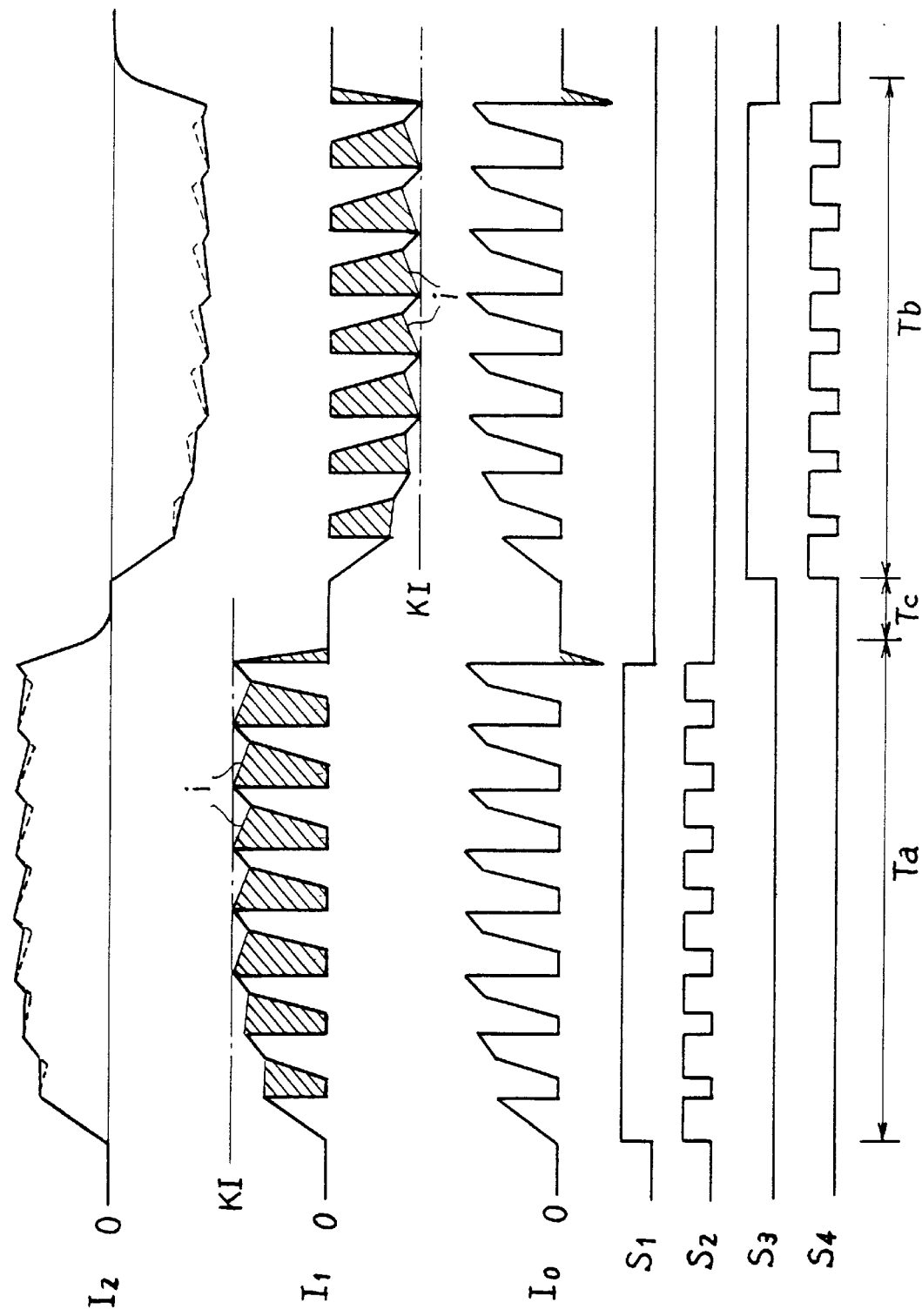
FIG. 4 is a waveform diagram showing signal and current waveforms appearing at associated parts in the supply of welding current of the embodiment.

FIG. 2 depicts an overall procedure of control provided by the control unit 30 during the supply of welding current, and FIG. 3 depicts a procedure of processing of a constant current control (limiter control) thereamong. FIG. 4 shows signal or current waveforms which can appear at different parts during the supply of welding current. FIGS. 5 to 8 illustrate a circuit through which a primary transient current flows in the respective current supply patterns.

In the resistance welding apparatus of this embodiment, the pair of welding electrodes 18 and 20 are directly connected to the secondary coil of the welding transformer 16 without intervention of any rectifying circuit so that inverter-controlled AC resistance welding is carried out.

In the case of the inverter-controlled AC welding, it is normal to define as a half-cycle both a unit weld period $T_a$ during which a welding current (secondary current) $I_2$ continuously flows through the materials ($W_1$, $W_2$) to be welded in the positive direction and a unit weld period $T_b$ during which it continuously flows therethrough in the negative direction, and to set the entire weld time from the start to the end of the welding current supply to be equal to the cycle count integer times the half cycle.

In response to input of a predetermined signal giving an instruction on welding current supply, the control unit 30 first reads from the storage unit 38 set values for various welding conditions and current supply conditions such as the unit weld periods ($T_a$ and $T_b$) with respective polarities, the entire weld time, the current peak values, etc., and places them into predetermined registers (step $A_1$).

In order to start the supply of welding current, all the switching elements $Q_1$, $Q_2$, $Q_3$ and $Q_4$ of the inverter 16 are initialized to OFF or confirmed to be in OFF state (step $A_2$), and then one of the positive side switching elements $Q_1$ and $Q_2$ to be conductive during the first unit weld period $T_a$, for example, the first switching element $Q_1$ is set to ON state (step $A_3$). To turn on the switching element $Q_1$, a switching control signal $S_1$ is set to high level. At the same time, a constant current limiter control is started by the second switching element $Q_2$ (step $A_4$).

In the constant current limiter control (step $A_4$), as shown in FIG. 3, when receiving a clock pulse φ from the clock circuit 36 (step $B_1$), the control unit 30 sets the second switching control signal $S_2$ to high level at the leading edge of the clock pulse φ to thereby turn on the second switching element $Q_2$.

Thus, both the switching elements $Q_1$ and $Q_2$ on the positive side become ON, allowing a rise of the primary current $I_1$ in the positive direction.

When the primary current $I_1$ normally rises, a current detection signal <$I_1$> reaches the limiter level KI within the associated cycle, and at this point of time the output voltage at the comparator 28 is switched from low level to high level. In response to this (step $B_3$), the control unit 30 causes the second switching control signal $S_2$ to go to low level, to turn off the second switching element $Q_2$.

Due to any variations such as an increase in resistance value of the secondary circuit or a drop in the three-phase AC power supply voltage, there may occur an insufficient rise of the primary current $I_1$, as a result of which the current detection signal <$I_1$> may not reach the limiter level KI within the associated cycle. In such a case, the control unit 30 causes the switching control signal $S_2$ to go to low level at the trailing edge of the clock pulse φ, to thereby turn off the switching element $Q_2$ (step $B_4$).

At the same time when turning off the switching element $Q_2$, the control unit 30 imparts a control signal CH to the sample-and-hold circuit 26 to cause the latter to hold the level of the current detection signal <$I_1$> at that point of time. Then, the control unit 30 fetches the held current peak value by way of the analog-to-digital converter 32 and stores it as a measured current value into a predetermined storage address in the storage unit 38 (step $B_6$). Thus, the constant current limiter control for one cycle terminates.

During the first unit weld period $T_a$, while the first switching element $Q_1$ is kept ON (step $A_3$), while the second switching element $Q_2$ is iteratively turned ON/OFF at the inverter frequency (at the period of the clock pulse φ) under the constant current limiter control as set forth above (steps $A_4 \rightarrow A_5 \rightarrow A_6 \rightarrow A_4$).

In each switching cycle during the unit weld period $T_a$, when the second switching element $Q_2$ is changed over from ON state to OFF state, the primary current $I_1$ will not immediately come to a rest due to inductance of the welding transformer 16 but it will flow as a transient current i through the primary circuit until it is off.

Figure 5:
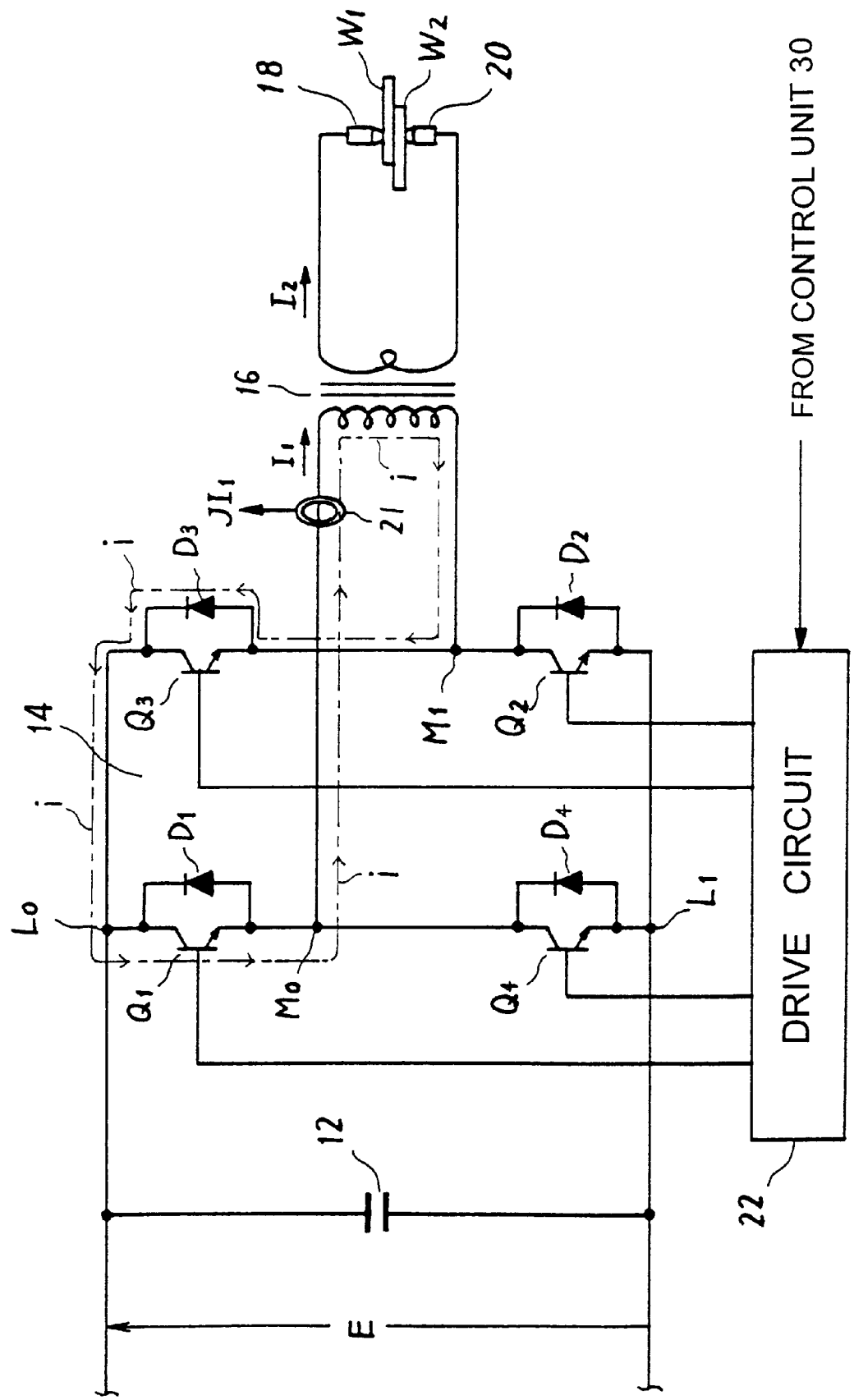
FIG. 5 is a circuit diagram showing a circuit through which a primary transient current flows in a first current supply pattern of the embodiment.

In the resistance welding apparatus of this embodiment, the transient current i in such a case flows through a closed circuit extending from the primary coil of the welding transformer 16 via the third diode $D_3$ and then the first switching element $Q_1$ again into the primary coil of the welding transformer 16, as indicated by a chain-dotted line in FIG. 5. This means that due to the retention of the first switching element $Q_1$ at ON state, the transient current i which has passed through the third diode $D_3$ will not flow toward the capacitor 12 but instead will flow through the first switching element $Q_1$ again into the primary coil of the welding transformer 16. Little or substantially no current flows through the capacitor 12.

When the first unit weld period $T_a$ comes to an end (step $A_5$), the switching action of the second switching element $Q_2$ as described above is stopped, while simultaneously the first switching control signal $S_1$ is caused to go to low level, to turn off the first switching element $Q_1$ so that all the switching elements $Q_1$ to $Q_4$ are once returned to OFF state (steps $A_8 \rightarrow A_2$)

In the second unit weld period $T_b$ subsequent to a halt period $T_c$ for the switching of polarity which follows, selection is made of the switching elements $Q_3$ and $Q_4$ on the negative side, one of which, the third switching element $Q_3$ for example is set to ON state (step $A_3$). To this end, the third switching control signal $S_3$ is set to high level.

Then, the fourth switching element $Q_4$ is iteratively turned ON/OFF at the inverter frequency (at the period of the clock pulse φ) in accordance with the constant current limiter control similar to the above (steps $A_4 \rightarrow A_5 \rightarrow A_6 \rightarrow A_4$).

Figure 6:
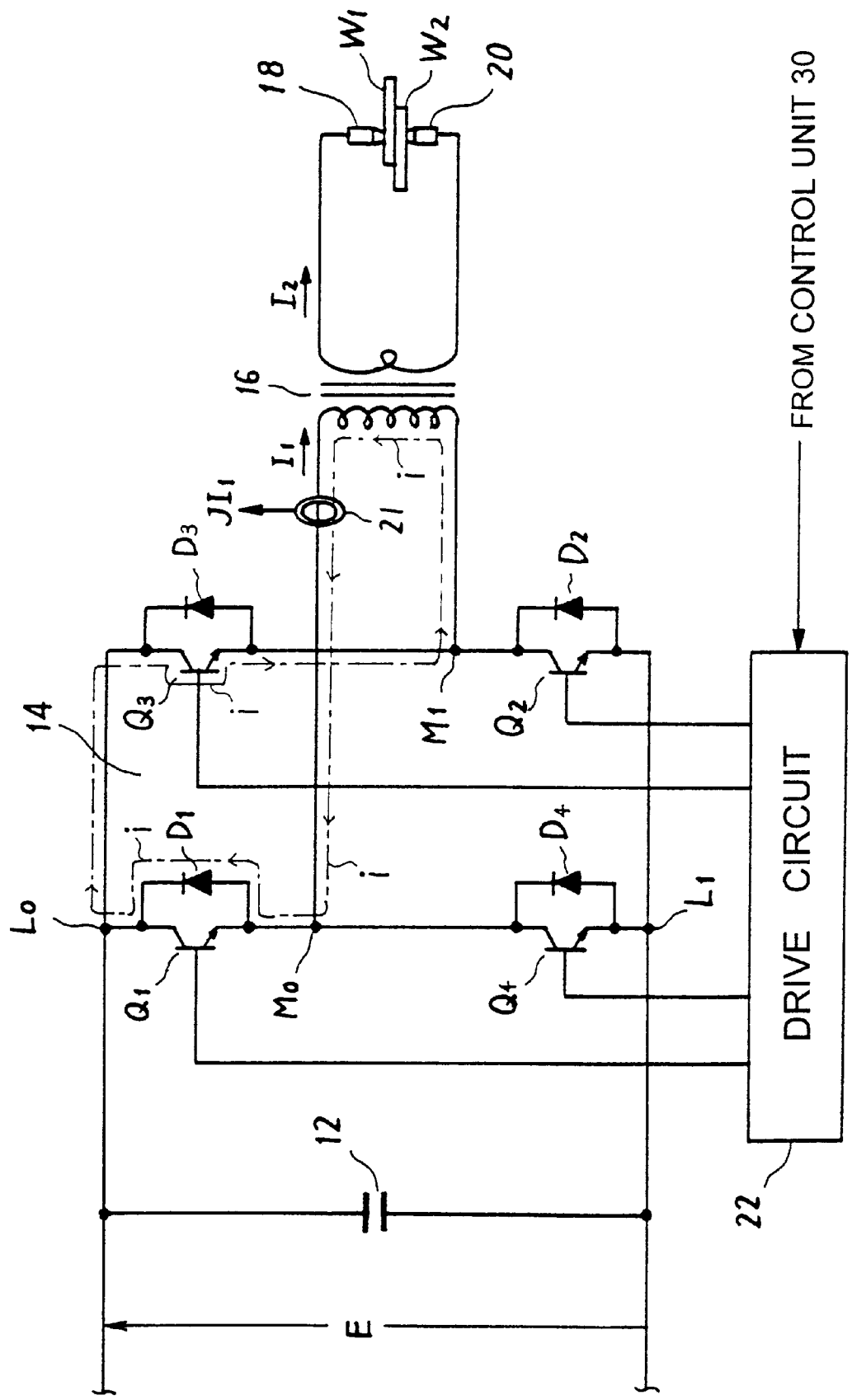
FIG. 6 is a circuit diagram showing a circuit through which the primary transient current flows in a third current supply pattern of the embodiment.

During this second unit weld period $T_b$, every time the fourth switching element $Q_4$ is changed over from ON state to OFF state in each switching cycle, the transient current i of the primary current $I_1$ flows through a closed circuit extending from the primary coil of the welding transformer 16 via the first diode $D_1$ and then the third switching element $Q_3$ again into the primary coil of the welding transformer 16, as indicated by a chain-dotted line in FIG. 6.

This means that due to the retention of the third switching element $Q_3$ at ON state, the transient current i which has passed through the first diode $D_1$ will not flow toward the capacitor 12 but instead will flow through the third switching element $Q_3$ again into the primary coil of the welding transformer 16. In this case as well, little or substantially no current flows through the capacitor 12.

In the case of such an inverter-controlled AC welding as in this embodiment, the current supply in the unit weld period $T_a$ on the odd-numbered (positive) side alternates with the current supply in the unit weld period $T_b$ on the even-numbered (negative) side by predetermined number of times with the polarity switching halt period $T_c$ interposed therebetween. Then, upon the ending of the entire weld time (step $A_7$), the supply of welding current terminates.

After the termination of the supply of welding current, the appropriate analysis or statistical processing may be made of the measured current values for full cycles which have been stored in the storage unit 38 in the constant current limiter control, to thereby judge whether the welding is good or poor.

In the current supply sequence depicted in FIG. 4, during the unit weld period $T_a$ on the odd-numbered (positive) side, the second switching element $Q_2$ effects its iterative ON/OFF at the inverter frequency while the first switching element $Q_1$ is kept ON, whereas during the unit weld period $T_b$ on the even-numbered (negative) side, the fourth switching element $Q_4$ is subjected to iterative ON/OFF at the inverter frequency with the third switching element $Q_3$ kept ON.

This current supply pattern may be iterated throughout the entire weld time, although it may suffer from unbalanced current burdens among the switching elements $Q_1$, $Q_2$, $Q_3$ and $Q_4$ as well as among the diodes $D_1$, $D_2$, $D_3$ and $D_4$, as a result of which any specific switching elements or diodes are always apt to become worn out.

To deal with this problem, the switching elements ($Q_1$, $Q_2$) and ($Q_3$, $Q_4$) in pairs may play their respective roles alternately in the unit weld period $T_a$ on the odd-numbered side and the unit weld period $T_b$ on the even-numbered side, respectively, so as to ensure that the current burdens can uniformly be distributed among the switching elements $Q_1$ to $Q_4$ and among the diodes $D_1$ to $D_4$ whereby wearout of each element will be relieved with less possibility of occurrence of failures.

According to this current supply sequence, in the third unit weld period $T_a$ subsequent to the second unit weld period $T_b$ of FIG. 4 for example, the first switching element $Q_1$ effects its iterative ON/OFF at the inverter frequency while the second switching element $Q_2$ remains ON.

Figure 7:
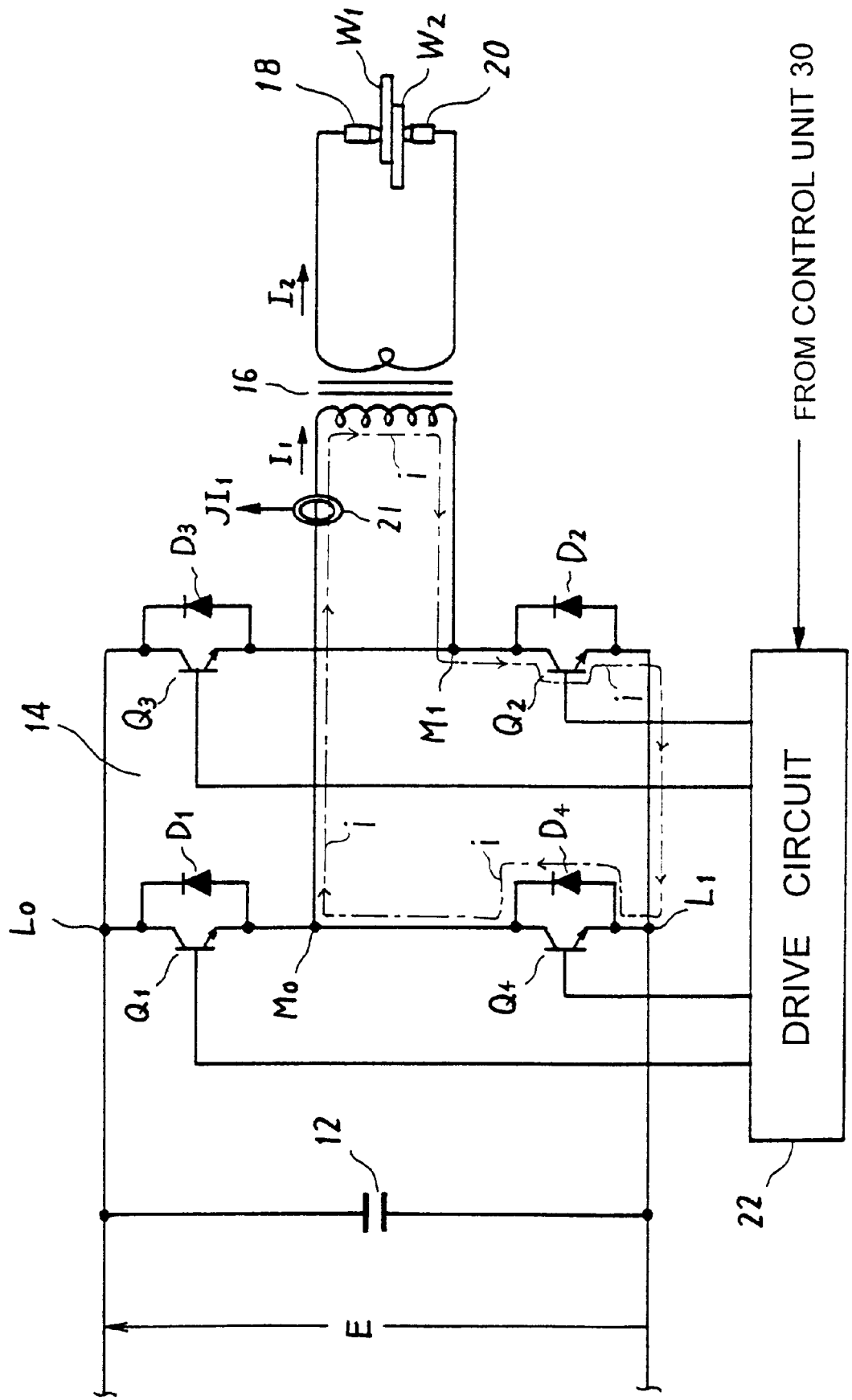
FIG. 7 is a circuit diagram showing a circuit through which the primary transient current flows in a second current supply pattern of the embodiment.

In such a case, every time the first switching element $Q_1$ is changed over from ON state to OFF state in each switching cycle, the transient current i of the primary current $I_1$ makes a closed circuit flowing from the primary coil of the welding transformer 16 via the second switching element $Q_2$ and then the fourth diode $D_4$ again into the primary coil of the welding transformer 16, as indicated by a chain-dotted line in FIG. 7. In this case as well, little or substantially no transient current flows through the capacitor 12.

Furthermore, in the fourth unit weld period $T_b$ for example, the third switching element $Q_3$ is turned ON/OFF at the inverter frequency in an iterative manner while the fourth switching element $Q_4$ remains kept ON.

Figure 8:
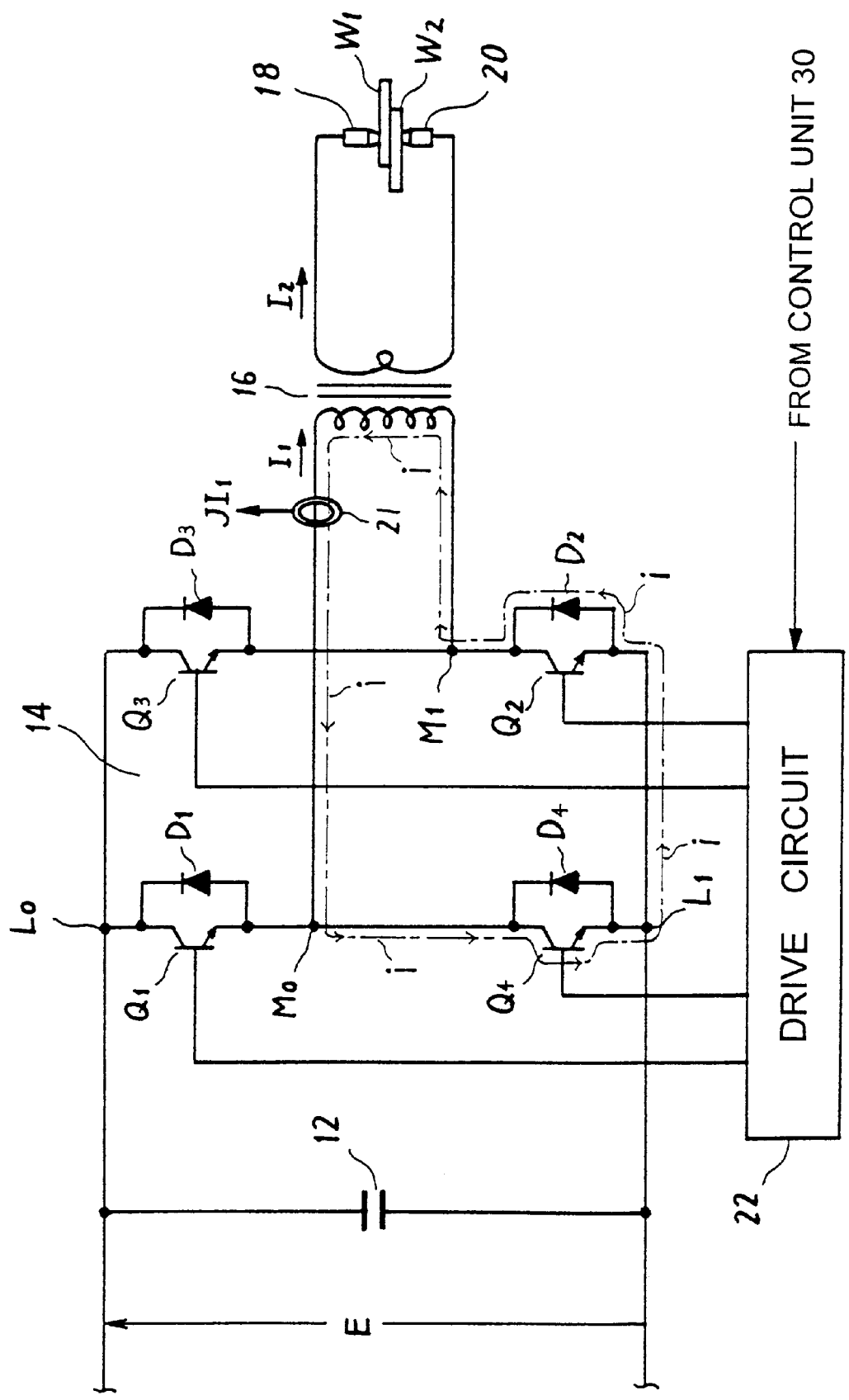
FIG. 8 is a circuit diagram showing a circuit through which the primary transient current flows in a fourth current supply pattern of the embodiment.

In such a case, whenever the third switching element $Q_3$ is changed over from ON state to OFF state in each switching cycle, the transient current i makes a closed circuit extending from the primary coil of the welding transformer 16 via the fourth switching element $Q_4$ and the second diode $D_2$ again into the primary coil of the welding transformer 16, as indicated by a chain-dotted line in FIG. 8. In this case as well, little or substantially no transient current flows through the capacitor 12.

Thus, in the case of the current supply control method of this embodiment, with the aim of feeding welding current from the rectifying circuit 10 via the inverter 14 to the welding transformer 16, one of a pair of switching elements selected within the inverter 14 is iteratively turned ON/OFF at the inverter frequency while the other switching element remains ON, whereby the primary transient current i upon the switch-off in each switching cycle of the inverter can flow through a closed circuit formed by the primary coil of the welding transformer 16 and by the inverter 14 without being allowed to flow into the smoothing capacitor 12.

This will prevent the capacitor 12 and its peripheral conductors from heating by the transient current i, so that the wearout and degradation of the capacitor 12 can be suppressed correspondingly. The lifetime of the capacitor 12 is thus elongated.

Furthermore, this resistance welding machine will not accelerate the wearout and degradation of the capacitor 12 in spite of an increased welding current or a higher duty cycle.

It is therefore possible to allow a larger welding current to flow through the materials ($W_1$ and $W_2$) to be welded and to raise the duty cycle without giving attention to the lifetime of the capacitor 12.

Also, according to the current supply control method of this embodiment, the primary transient current i flows through a switching element Q in ON state having an extremely low impedance in place of the capacitor 12, so that little or substantially no power will dissipate in vain as a result of heating within the primary circuit, as indicated by the hatched portion in FIG. 4, but instead the most of it will effectively be converted via the welding transformer 16 into a secondary current component $I_2$. In consequence, the ripple of the secondary current $I_2$ is reduced with an improved accuracy of constant current control and with an improved efficiency of welding current supply to the materials ($W_1$ and $W_2$) to be welded. Thus, the weld quality is also improved.

Furthermore, in the resistance welding apparatus of this embodiment, the capacitor 12 serves solely to reduce the ripple of the DC voltage E output from the rectifying circuit 10. It would therefore be possible to eliminate the capacitor 12 when the ripple of the DC voltage E from the rectifying circuit 10 is small.

Figure 9:
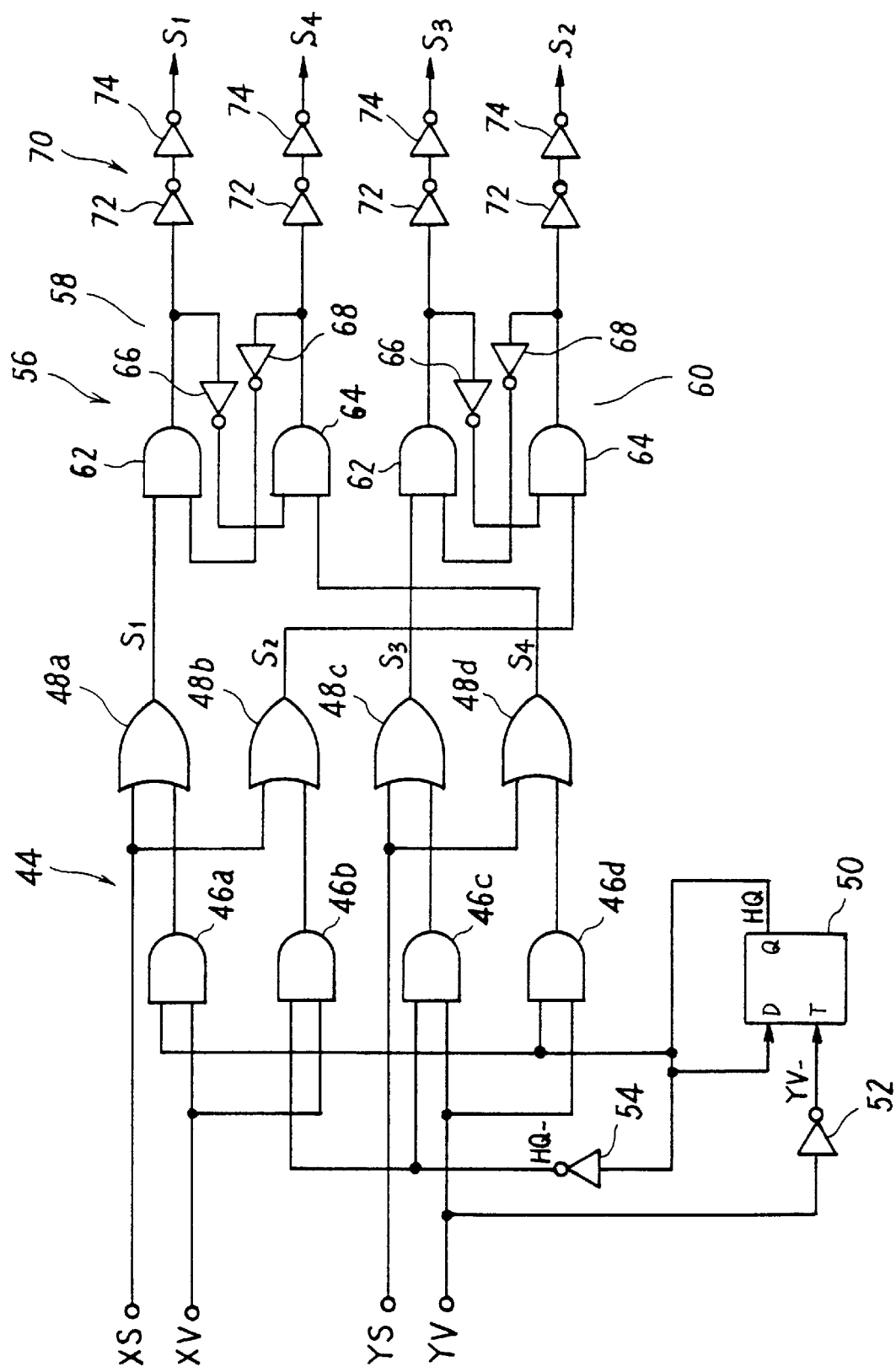
FIG. 9 is a circuit diagram showing by way of example a circuit configuration of a drive circuit in the embodiment.
Figure 10:
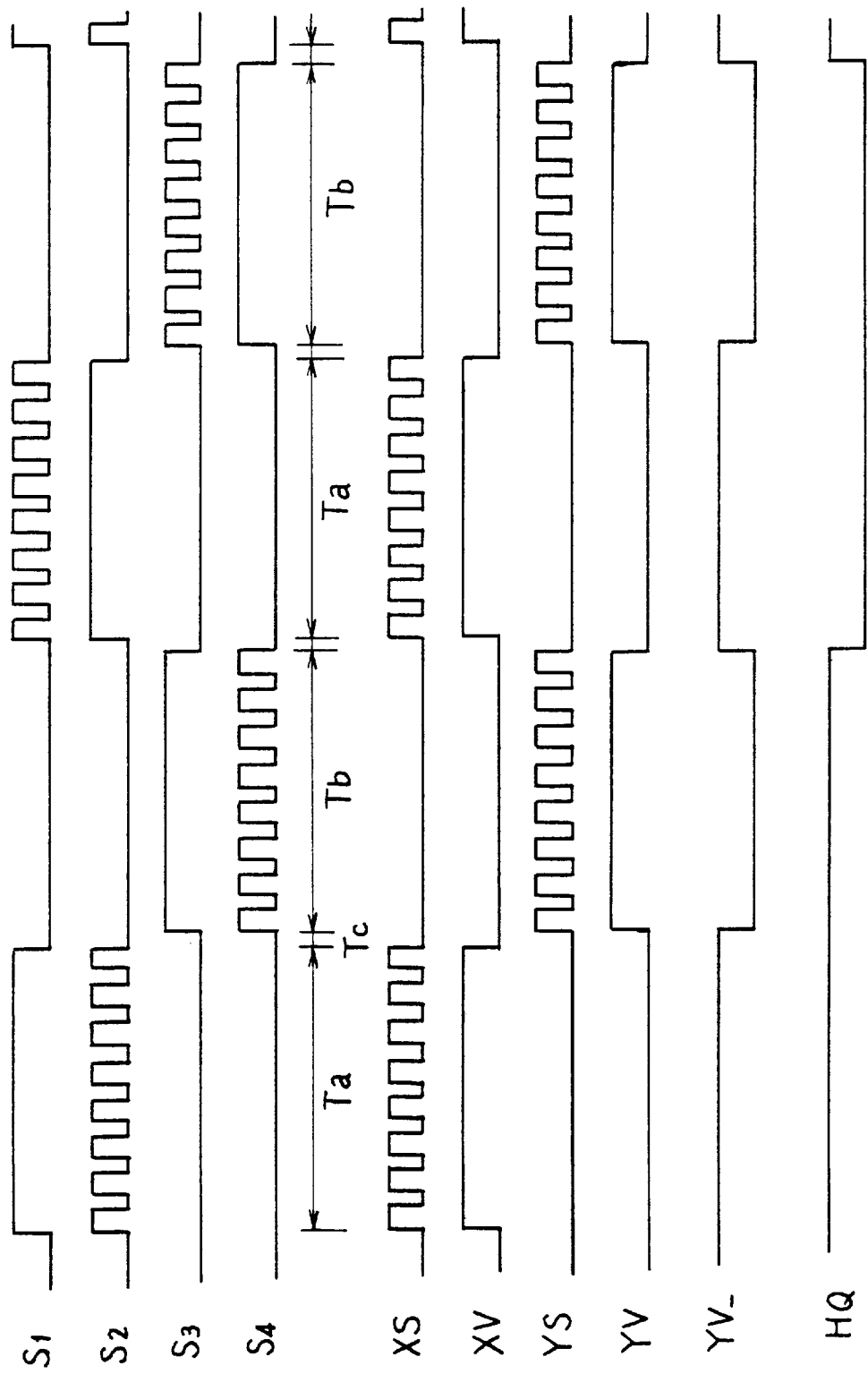
FIG. 10 is a waveform diagram showing signal waveforms at the associated parts within the circuit of FIG. 6.

FIG. 9 shows an exemplary circuit configuration of the drive circuit 22 in this embodiment, and FIG. 10 shows signal waveforms at the associated parts within this circuit.

The drive circuit 22 comprises a switching control signal generating section 44, an interlocking section 56 and an output section 70.

The switching control signal generating section 44 includes four AND gates 46a to 46d, four OR gates 48a to 48d, a single D-type flip-flop (latching circuit) 50 and two inverting circuits 52 and 54.

The switching control signal generating section 44 receives four control signals XS, YS, XV and YV from the control unit 30. The signal XV is a mode control signal for selecting a first pair (positive side) of switching elements $Q_1$ and $Q_2$, and the signal YV is a mode control signal for selecting a second pair (negative side) of switching elements $Q_3$ and $Q_4$. The signal XS is a control pulse for turning ON/OFF one of the first pair of switching elements $Q_1$ and $Q_2$ at the inverter frequency, and the signal YS is a control pulse for turning ON/OFF one of the second pair of switching elements $Q_3$ and $Q_4$ at the inverter frequency.

The first mode selection signal XV is fed to input terminals on one hand of both the AND gates 46a and 46b. The second mode selection signal YV is fed to input terminals on one hand of both the AND gates 46c and 46d.

The first control pulse XS is fed to input terminals on one hand of both the OR gates 48a and 48b. The second control pulse YS is fed to input terminals on one hand of both the OR gates 48c and 48d.

The second mode selection signal YV is fed to an input terminal of the inverting circuit 52 as well. This inverting circuit 52 and the latching circuit 50 make up a ½ frequency divider circuit. An output signal HQ from the latching circuit 50 is fed to input terminals on the other of both the AND gates 46a and 46d. Furthermore, the inverting circuit 54 logically inverts the signal HQ to acquire a signal HQ⁻, which in turn is fed to input terminals on the other of both the AND gates 46b and 46c. Outputs from the AND gates 46a, 46b, 46c and 46d are fed to input terminals on the other of the OR gates 48a, 48b, 48c and 48c, respectively.

In the first current supply mode for selecting the first pair, the signals XV and XS are made active, whereas the signals YV and YS are made inactive. Then, in response to the active signals XV and $XS_1$ gate functions of the AND gates 46a and 46b and of the OR gates 48a and 48b work, allowing active first and second switching control signals $S_1$ and $S_2$ to be acquired at output terminals of the OR gates 48a and 48b.

On the contrary, the signals YV and YS are inactive in this current supply control mode, with the result that the AND gates 46c and 46d and the OR gates 48c and 48d become substantially inactive, allowing inactive (fixed at low level) fourth and third switching control signals $S_4$ and $S_3$ to be acquired at output terminals of the OR gates 48c and 48d.

For each unit weld period $T_a$ and $T_b$, the output from the ½ frequency divider circuit (50, 52) allows alternate inversion of the functions of the AND gates (46a, 46b) and (46c, 46d) for the mode selection signals XV and YV and therefore of the functions of the OR gates (48a, 48b) and (48c, 48d) for the control pulses XS and YS. As a result, for each unit weld period $T_a$ and $T_b$, alternate inversion is imparted also to the waveforms of the switching control signals ($S_1$, $S_2$) and ($S_3$, $S_4$) acquired at the output terminals of the OR gates (48a, 48b) and (48c, 48d).

The interlocking section 56 includes a first interlocking circuit 58 for preventing the first and fourth switching control signals $S_1$ and $S_4$ from becoming active (high) at the same time, and a second interlocking circuit 60 for preventing the second and third switching control signals $S_2$ and $S_3$ from becoming active (high) at a time. The interlocking circuits 58 and 60 each consist of two AND gates 62 and 64 and two inverting circuits 66 and 68. Arrangement is such that when the output from one of the AND gates 62 and 64 is high, a low level is imparted via the inverting circuit 66 or 68 to one input terminal of the other AND gate whereby a low level is output compulsorily irrespective of the logical level of the switching control signal input thereto.

This avoids simultaneous turning-ON of the first and fourth switching elements $Q_1$ and $Q_4$ and of the second and third switching elements $Q_2$ and $Q_3$, thereby preventing a possible shortcircuiting breakdown of each switching element.

The output section 70 includes two inverter drivers 72 and 74 corresponding to each of the switching signals $S_1$, $S_2$, $S_3$ and $S_4$, which two drivers are connected in series with each other so that the respective control signals at predetermined voltage levels are fed to the associated switching elements $Q_1$ to $Q_4$.

It is to be noted that the number of the switching pulses of FIGS. 4 and 10 is merely an example and that selection could be made of any arbitrary times or periods and inverter frequencies. Furthermore, the circuit configuration of the drive circuit 22 of FIG. 9 and the switching control of FIG. 10 are also provided by way of example, and it will be obvious to those skilled in the art that a diversity of variants are possible.

Although the above embodiment employs a limiter control method as a feedback loop constant current control method, use may be made of a pulse width control method in which the pulse width of the control pulse for each inverter cycle is controlled by computing.

In the resistance welding apparatus of the above embodiment, the welding electrodes 18 and 20 have directly been connected to the secondary coil of the welding transformer 16 to effect inverter-controlled AC resistance welding.

Figure 11:
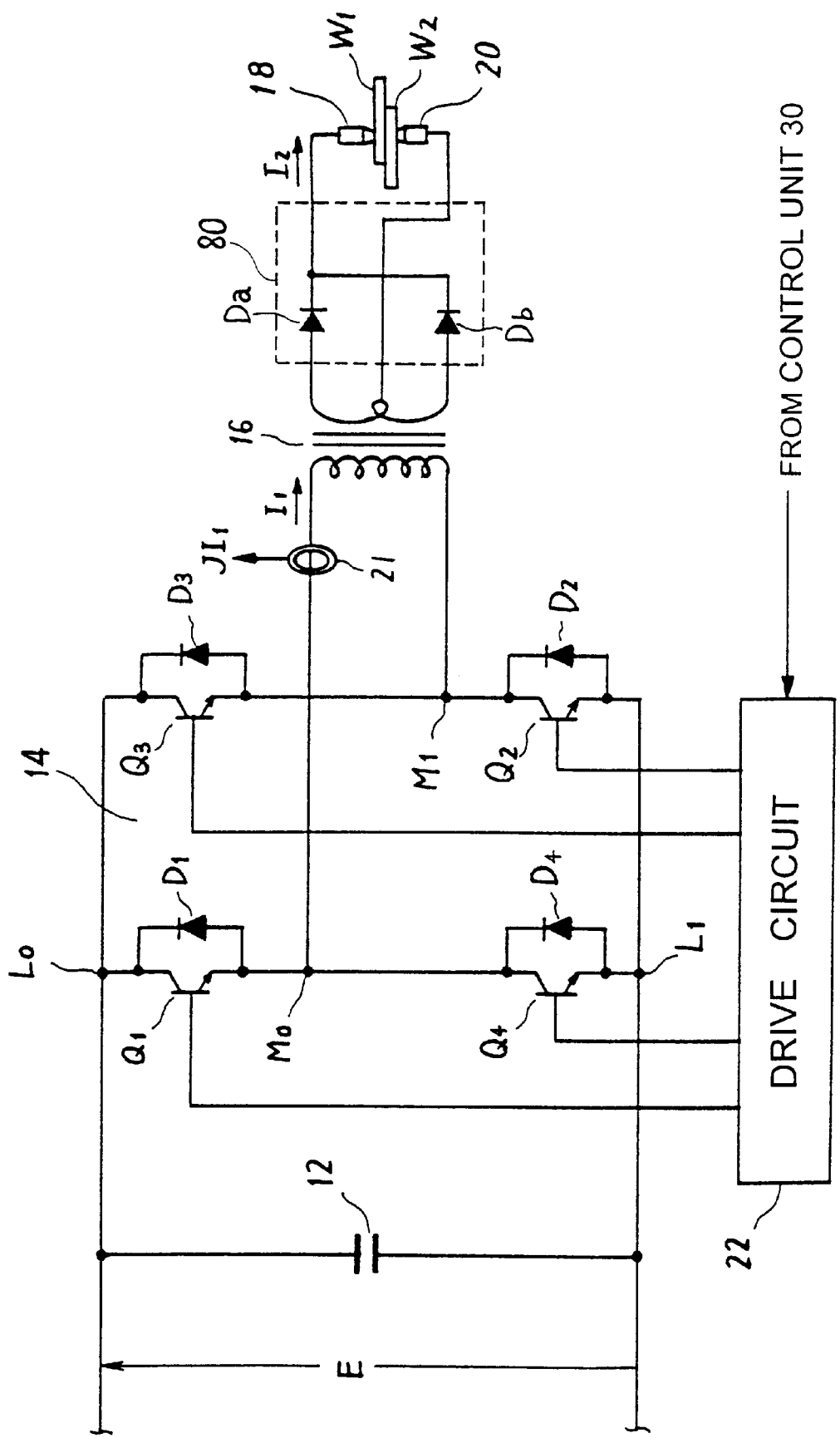
FIG. 11 illustrates a configuration of an inverter-controlled DC resistance welding apparatus in accordance with a variant.
Figure 12:
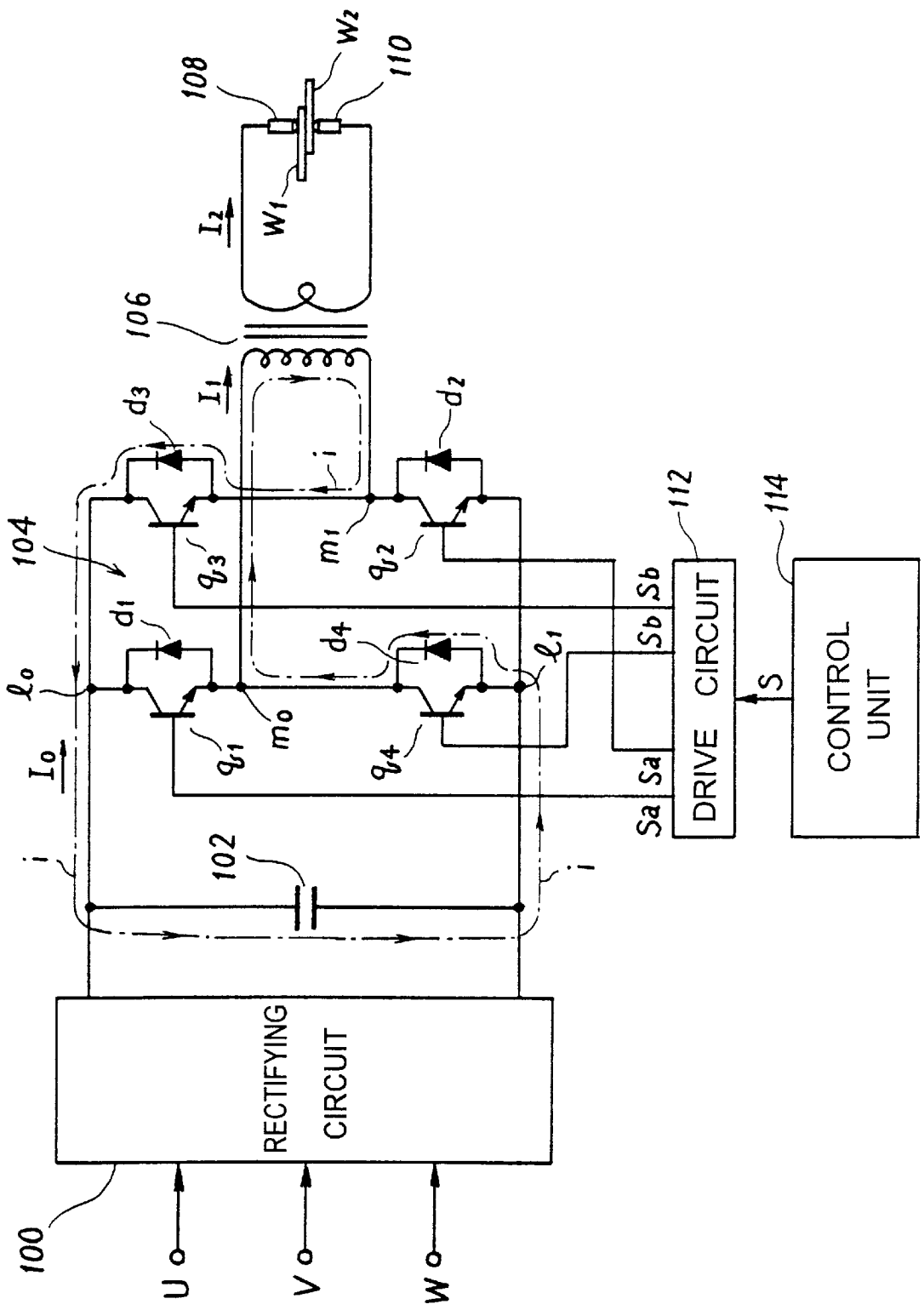
FIG. 12 is a diagram showing a configuration and a function of a conventional inverter resistance welding control apparatus.
Figure 13:
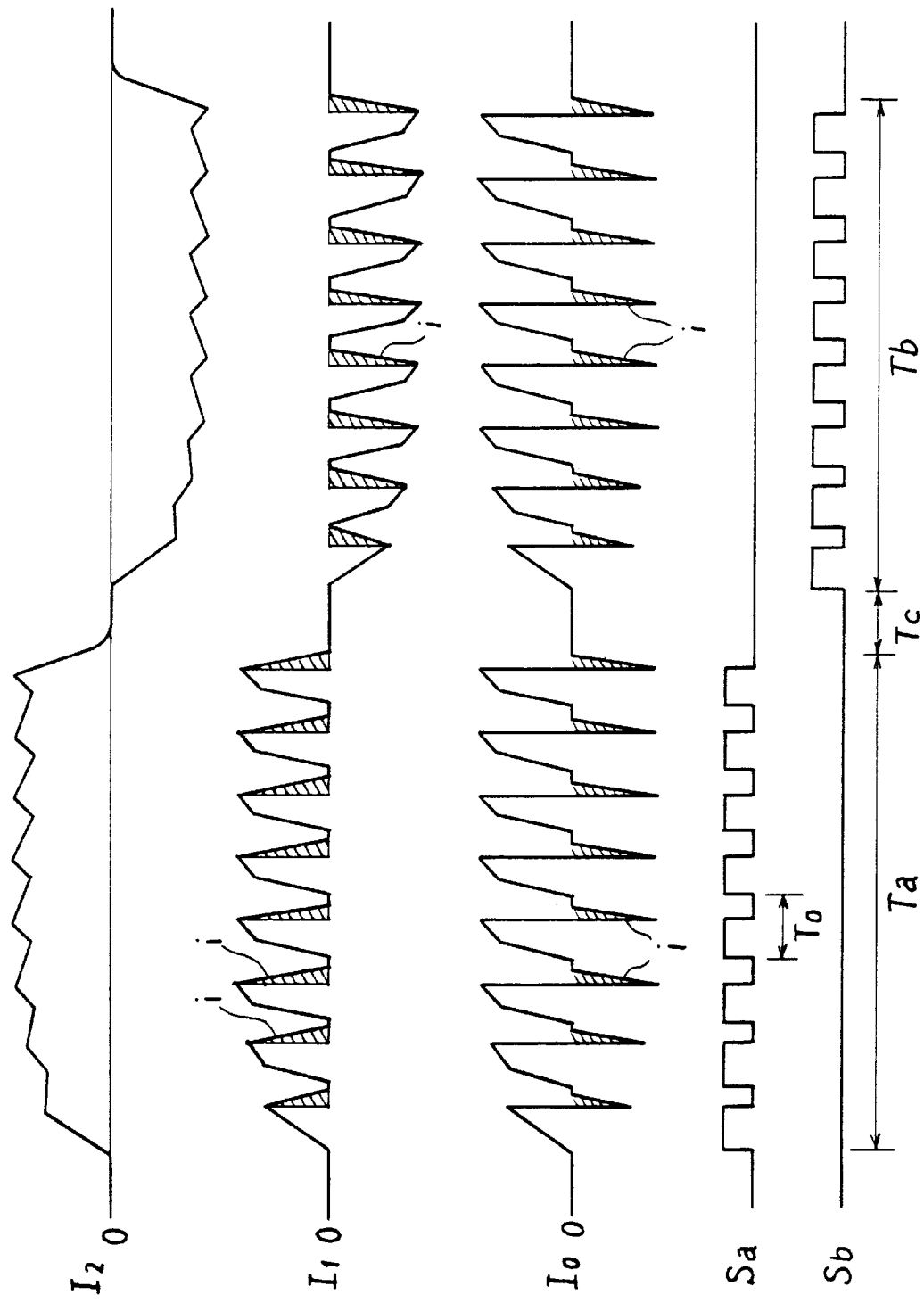
FIG. 13 is a signal waveform diagram showing a current supply control method effected in the conventional inverter resistance welding control apparatus.

As can be seen in FIG. 11, however, the welding electrodes 18 and 20 may be connected to the secondary coil of the welding transformer 16 by way of a rectifying circuit 80 consisting of a pair of diodes $D_a$ and $D_b$ to thereby effect inverter-controlled DC resistance welding. In the case of the inverter-controlled DC welding, the negative side switching elements $Q_3$ and $Q_4$ are selected on the primary side so that even when the primary current $I_1$ flows in the negative direction, on the secondary side the DC secondary current $I_2$ is fed to the materials ($W_1$, $W_2$) to be welded by virtue of the rectifying function of the rectifying circuit 80.

In the case of the inverter-controlled AC welding as well, it would be possible that one switching element which remains ON in each unit weld period alternates at any sequence with the other switching element which is turned ON/OFF at the inverter frequency.

What is claimed is:

1. An inverter resistance welding control apparatus for use in resistance welding effected by the supply of a welding current to a material to be welded, which is electrically connected to a secondary coil of a welding transformer, said resistance welding control apparatus comprising:

a rectifying circuit for converting an alternating current at a commercial frequency into a direct current;

an inverter including two pairs of uni-directional conduction switching elements, each pair of switching elements having an input terminal electrically connected to an output terminal of said rectifying circuit and having an output terminal electrically connected to a primary coil of said welding transformer;

a diode connected, in parallel to each switching element of said inverter, with its polarity of conduction reversed to that of said switching element;

current supply sequential control means for switchingly selecting, in a predefined sequence, a first current supply mode in which a welding power from said rectifying circuit is fed to said welding transformer by way of first and second switching elements constituting a first pair in said inverter, and a second current supply mode in which a welding power from said rectifying circuit is fed to said welding transformer by way of third and fourth switching elements constituting a second pair in said inverter; and switching control means which in said first current supply mode, iteratively turns ON/OFF, at a predetermined inverter frequency, only one of said first and second switching elements while keeping the other ON and which in said second current supply mode, iteratively turns ON/OFF, at said inverter frequency, only one of said third and fourth switching elements while keeping the other ON.

2. An inverter resistance welding control apparatus according to claim 1, wherein said current supply sequential control means alternately select said first current supply mode and said second current supply mode.

3. An inverter resistance welding control apparatus according to claim 1, wherein said switching control means includes means which, every time said first current supply mode is iterated, alternately select a first current supply pattern in which only said second switching element is iteratively turned ON/OFF at said inverter frequency while keeping said first switching element ON and a second current supply pattern in which only said first switching element is iteratively turned ON/OFF at said inverter frequency while keeping said second switching element ON, and means which, every time said second current supply mode is iterated, alternately select a third current supply pattern in which only said fourth switching element is iteratively turned ON/OFF at said inverter frequency while keeping said third switching element ON and a fourth current supply pattern in which only said third switching element is iteratively turned ON/OFF at said inverter frequency while keeping said fourth switching element ON.

4. An inverter resistance welding control apparatus according to claim 1, wherein said switching control means include constant current control means for providing a control of ON/OFF operation of said switching element so as to allow a primary current flowing through a primary circuit of said welding transformer or a secondary current flowing through a secondary circuit to coincide with a set current value.

5. An inverter resistance welding control apparatus according to claim 4, wherein said constant current control means include:

a clock circuit for generating a clock pulse defining a unit cycle of switching operations of said inverter;

limiter level setting means for setting a predetermined limiter level corresponding to said set current value;

current detecting means for detecting said primary current or said secondary current during the supply of welding current; and control means which in each clock cycle, turn on said associated switching element in response to a leading edge of said clock pulse and which turn off said switching element at the point of time when an output signal from said current detecting means has reached said limiter level or at the trailing edge of said clock pulse.

* * * * *